(12) United States Patent
Wright et al.

(10) Patent No.: US 8,665,100 B2
(45) Date of Patent: Mar. 4, 2014

(54) PRECONDITIONED AIR (PCA) TEMPERATURE MONITOR

(75) Inventors: Joe W. Wright, Xenia, OH (US); James Dillon, Jamestown, OH (US); Dave McIntire, Beavercreek, OH (US)

(73) Assignee: Twist, Inc., Jamestown, OH (US)

( * ) Notice: Subject to any disclaimer, the term of this patent is extended or adjusted under 35 U.S.C. 154(b) by 402 days.

(21) Appl. No.: 12/861,317

(22) Filed: Aug. 23, 2010

(65) Prior Publication Data

US 2011/0050430 A1   Mar. 3, 2011

Related U.S. Application Data

(60) Provisional application No. 61/236,656, filed on Aug. 25, 2009.

(51) Int. Cl.
*G08B 17/00* (2006.01)

(52) U.S. Cl.
USPC ........... 340/584; 340/540; 340/589; 340/622; 285/148.15; 285/311; 285/320; 285/383

(58) Field of Classification Search
USPC ............. 340/584, 540, 589, 622; 285/148.15, 285/311, 320, 383
See application file for complete search history.

(56) References Cited

U.S. PATENT DOCUMENTS

| | | | |
|---|---|---|---|
| 3,959,787 A | 5/1976 | Messmann et al. | |
| 4,482,785 A | 11/1984 | Finnegan et al. | |
| 5,383,335 A * | 1/1995 | Anderson et al. | 62/89 |
| 5,431,021 A * | 7/1995 | Gwilliam et al. | 62/3.7 |
| 6,385,510 B1 | 5/2002 | Hoog et al. | |
| 7,349,824 B2 * | 3/2008 | Seigel | 702/182 |
| 8,174,396 B1 * | 5/2012 | Schrinner et al. | 340/584 |
| 8,302,236 B2 * | 11/2012 | Kim et al. | 14/71.5 |

* cited by examiner

*Primary Examiner* — Tai T Nguyen
(74) *Attorney, Agent, or Firm* — Wood, Herron & Evans, LLP

(57) ABSTRACT

The performance of a PCA unit associated with an airport gate is monitored by a temperature sensor in the stream of output air leaving the PCA unit, to produce a signal indicative of the temperature of the output air that may be compared to an acceptable range of values, or to the temperature of air input to the PCA unit (as measured by a second temperature sensor). An alert is generated to a human operator if the temperature measured does not compare favorably with the desired range.

3 Claims, 4 Drawing Sheets

PRECONDITIONED AIR (PCA) TEMPERATURE MONITOR

RELATED APPLICATIONS

The present invention claims priority to U.S. Ser. No. 61/236,656 filed Aug. 25, 2009, the disclosure of which is hereby incorporated herein by reference in its entirety.

FIELD OF THE INVENTION

The present invention generally relates to ground-based conditioned air systems for aircraft.

BACKGROUND

It is generally known to supply commercial aircraft with conditioned air for heating and cooling when the aircraft is stationary at a gate. In this application, the term gate is meant to refer to any place that an aircraft receives or discharges passengers or cargo. This may be by way of a telescoping corridor (also referred to as a walkway, bridge way, jet bridge), stairs, or any other facility. Typically, conditioned air is supplied to the aircraft from a pre-conditioned air (PCA) unit associated with the gate that is a part of the airport terminal. The PCA unit may produce heated air or cooled air depending on the needs of the aircraft it is servicing. The PCA outputs its air into a duct that may be rigid or flexible, and then the air is delivered from the gate to the aircraft with a flexible and usually insulated air hose. When not in use, the hose is usually stored under the terminal. In some installations a branch of the same duct, or a separate one, may be used to supply preconditioned air to the enclosed walkway that passengers walk through to access the airplane. In such a case, there may also be a return air duct from the walkway to the PCA unit, or there may not be one.

A problem arises if the PCA unit starts to malfunction and fails to supply the cooled air or the heated air of which it is capable. It is easy for this condition to go undetected, because a PCA unit is not used like a typical building heating, ventilation, and cooling (HVAC) unit. In the latter, the HVAC is permanently connected and typically running per the commands of a thermostat that is sensing room air temperature. The HVAC unit services a building of a given size, with a permanent ducting system that is never kinked, improperly connected, or torn. Usually there is a steady group of occupants, and a designated maintenance person to pay attention to the HVAC system. If the occupants become uncomfortable, it is quickly evident that the HVAC system is probably not cooling or heating to its usual ability, and corrective action is taken. But the situation with a PCA unit is different. For example, the PCA unit is called upon to service aircraft of different sizes. The flexible hose is often kinked because usually a single length hose is used to hook up aircraft with connections at varying distances from the PCA unit. The hose may be torn. There may be a delay in how quickly the PCA unit is hooked up to the aircraft and turned on. It may only be hooked up for a short time. Somebody may fail to turn the PCA unit on. The PCA unit may be switched off overnight even though an aircraft is parked at the gate, and the aircraft heats up in the sun the next morning, or cools down excessively overnight. For these and various other reasons a complaint of "too hot" or "too cold" by the people using the aircraft and the walkway may be considered of limited value by the ground based personnel who have to keep many PCA units operating. A decrease in operating performance by a PCA unit is likely to go unnoticed and unattended to by the people who could fix it before complete failure.

SUMMARY OF THE INVENTION

Thus, there is a need for a device that measures the output temperatures of a PCA unit close to the aircraft, so the measurement provided is unaffected by the vagaries of aircraft changes, air hose installations, and other conditions. Further, the device should alert people of a problem so that corrective action can be taken.

In accordance with principles of the present invention, the performance of a PCA unit associated with an airport gate is monitored by a temperature sensor in the stream of output air leaving the PCA unit, to produce a signal indicative of the temperature of the output air that may be compared to an acceptable range of values, or to the temperature of air input to the PCA unit (as measured by a second temperature sensor). An alert is generated to a human operator if the temperature measured does not compare favorably with the desired range.

Particular aspects involve both the apparatus for monitoring and the monitoring method described herein.

BRIEF DESCRIPTION OF THE DRAWINGS

The accompanying drawings, which are incorporated in and constitute a part of this specification, illustrate embodiments of the invention and, together with the general description of the invention given above, and the detailed description given below, serve to explain the principles of the invention.

DETAILED DESCRIPTION

Figure 1:
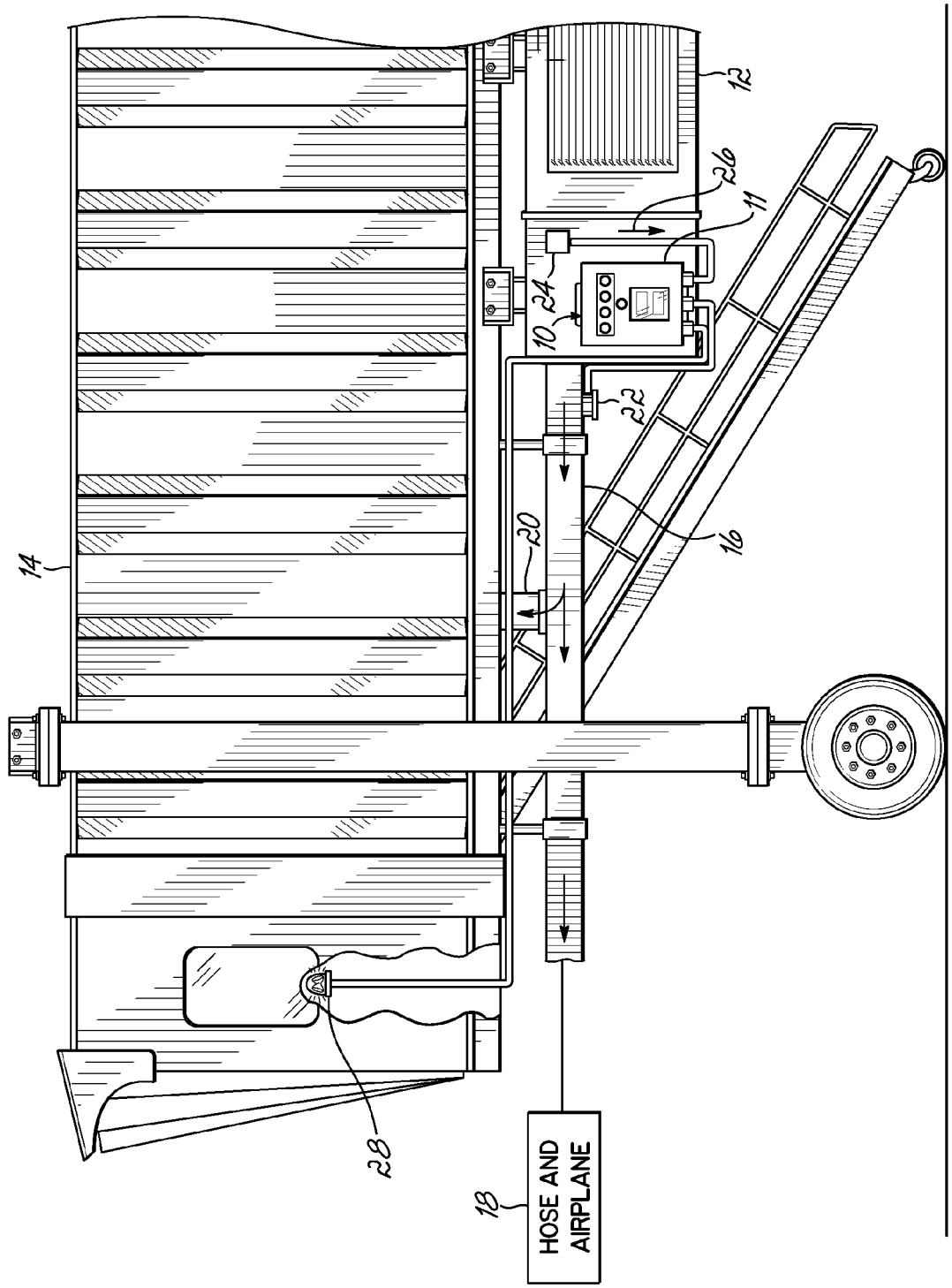
FIG. 1 is a perspective view illustrating an embodiment of the present invention installed at a PCA unit under an airport bridge way.

FIG. 1 illustrates a preconditioned air (PCA) temperature monitor 10 having a main box 11 (see FIG. 2) mounted near a PCA unit 12 on an airport bridge way 14. The PCA unit 12 blows preconditioned air into a duct 16 that runs to a PCA hose and airplane 18. A smaller duct 20 supplies air to the bridge way 14, although in many installations this smaller duct 20 may not exist or may be separate from the duct 16. Not all bridge ways 14 are supplied with air by a PCA unit 12. The PCA unit 12 has a temperature sensor 22 in the duct 16 to measure the temperature of air leaving the PCA unit 12. In one embodiment the temperature sensor 22 is a thermistor, although it could be another type of device. As illustrated, the temperature sensor 22 is remote from the main box 11, but it could be integral, depending on the specific design and mounting location. An electrical connection 24 from the PCA unit 12 provides a signal 26 to the PCA monitor 10 whenever the PCA unit 12 turns on. In some embodiments, the signal 26 may include information as to whether the PCA unit 12 is running in heating mode or cooling mode. A signaling device 28 in the form of a rotating or flashing light beacon is located in the operator's station of the bridge way 14. The signaling device 28 could be located in other places and take other forms. It may be wireless.

Figure 2:
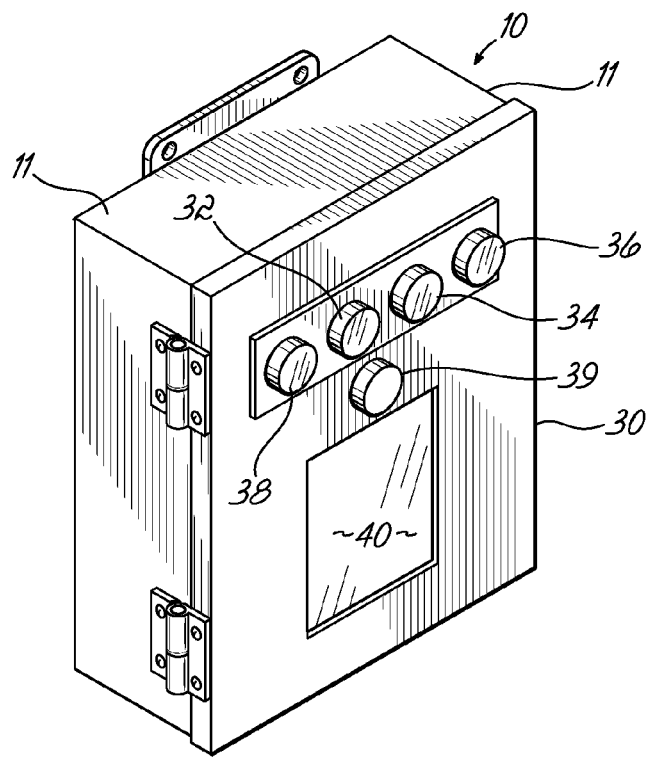
FIG. 2 is a perspective detail view of the control unit of the embodiment of FIG. 1.
Figure 3:
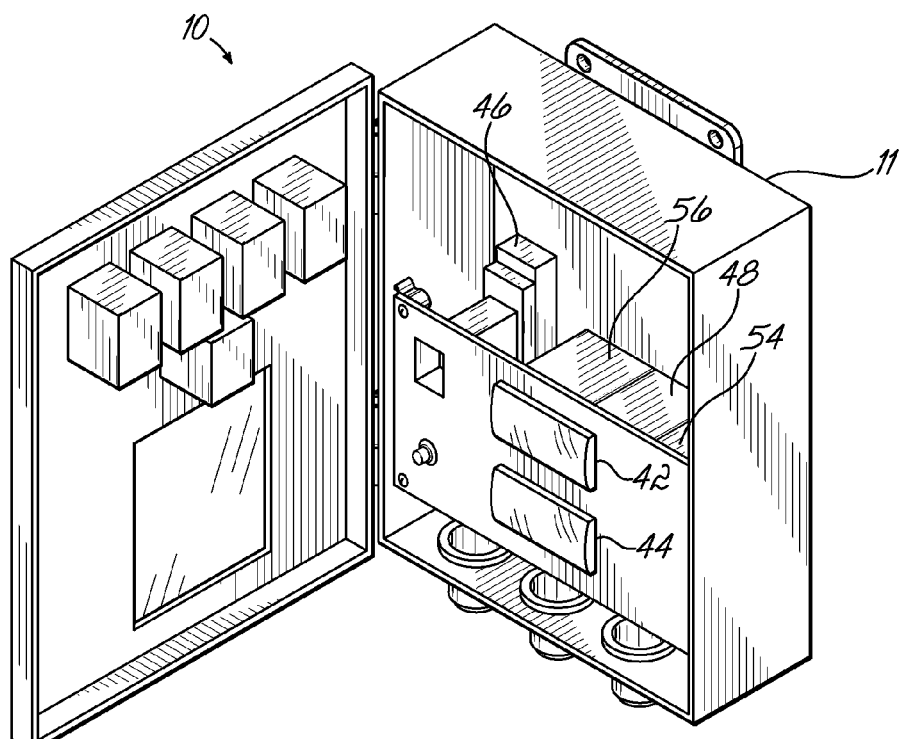
FIG. 3 is a perspective detail view of the control unit of FIG. 3 with an access door open.

FIGS. 2 and 3 schematically illustrate various portions of the main box 11. The front panel 30 has a cool cycle indicator 32, a heat cycle indicator 34, an over temperature indicator 36 an under temperature indicator 38, and a light test button 39. A display window 40 is aligned with a heat cycle display 42 and a cool cycle display 44. Fittings along the bottom accept connections to the temperature sensor 22, the PCA unit 12, and the signaling device 28. A timing circuit 46 determines when the PCA unit 12 has been on long enough that it and the path to the temperature sensor 22 should be at a steady state, rather than significantly changing. Alternatively, the timing circuit 46 used to predict steady state could be external to the PCA unit 12, or, steady state could be determined by the rate of change at the temperature sensor 22 and not be estimated by the elapsed time. Because an electrician of ordinary skill in the art could wire the PCA monitor 10 to the circuitry of the PCA unit 12, the wiring will not be further described here. What is important is that the PCA monitor 10 determine when the PCA unit 12 is operating and at steady state.

At least one settable memory device 48 has a value for an appropriate cooling cycle high temperature limit 50 and an appropriate heating cycle cold temperature limit 52. Heat cycle display 42 and cool cycle display 44, visible through the display window 40, show the limit values, and if desired the actual values. The limits are input either by inputting them into the box directly or remotely.

The PCA monitor 10 further comprises processing circuitry 54 and comparison circuitry 56 to compare the signal from the temperature sensor 22 to the temperature limits. Values that do not meet the limits will trigger the over temperature indicator 36 or the under temperature indicator 38 and the signaling device 28.

In use, a person, usually in a maintenance department, will set the cooling cycle high temperature limit 50 and the heating cycle cold temperature limit 52 to values based on the PCA unit's manufacturing specifications, or experience. Ordinarily the over temperature indicator 36 and the under temperature indicator 38 will remain off. Only if the PCA unit 12 is unable to precondition the air to the limits do the lights illuminate. The test button 39 activates test circuitry to confirm the lights are in working order.

If desired, the circuitry could be arranged differently. For example the indicator 36 and indicator 38 could be set to illuminate when things are working properly, and extinguish if they are not.

Figure 4:
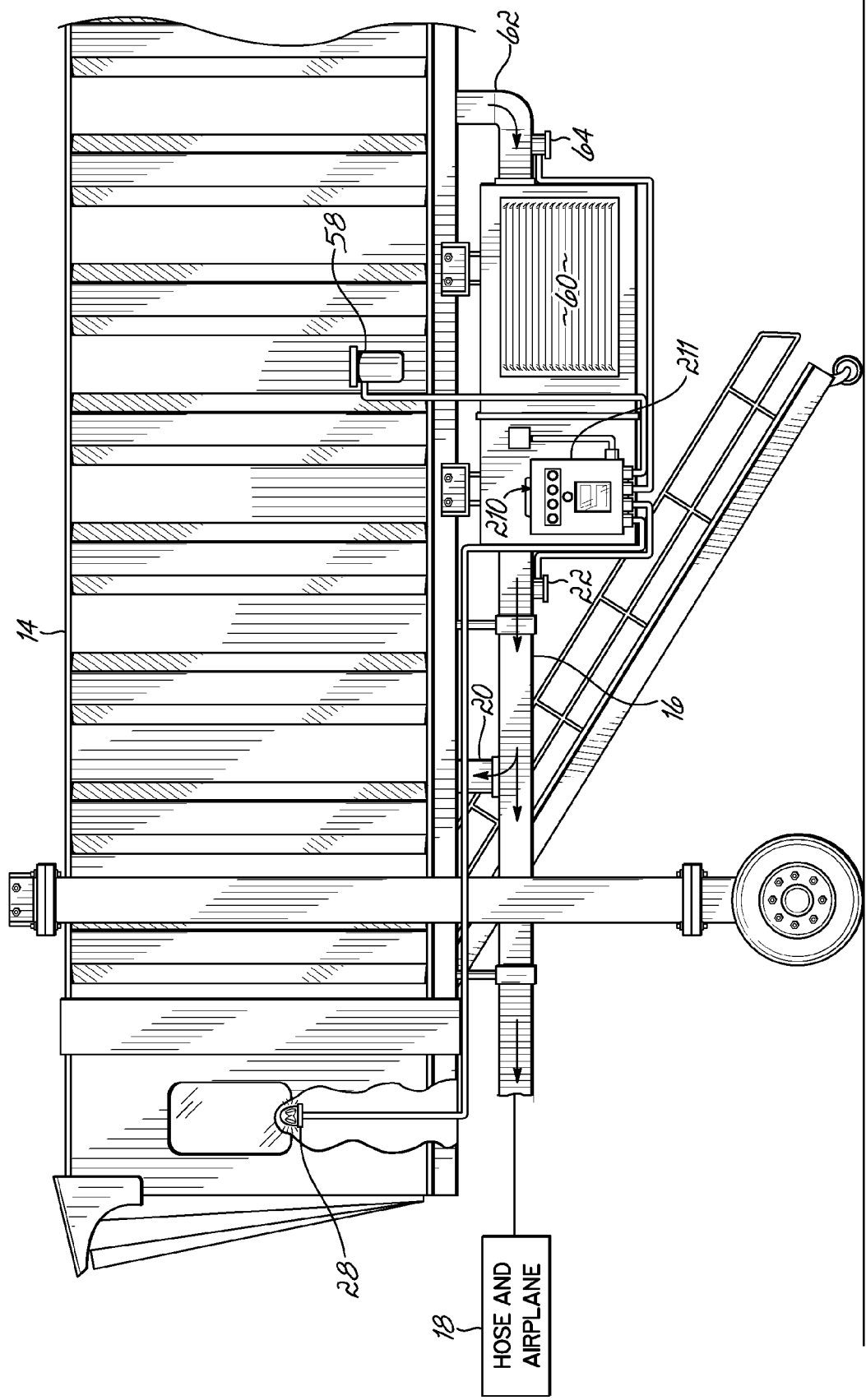
FIG. 4 is a perspective view illustrating a second embodiment of the present invention installed at a PCA unit under an airport bridge way.

FIG. 4 illustrates a second embodiment of a PCA monitor 210 that may enhance the ability to choose the cooling cycle high temperature limit 50 and the heating cycle cold temperature limit 52 that are more exact and work under a greater variety of conditions without giving false alarms.

One consideration when measuring only the temperature of the output air, as in FIG. 1, is that the temperature of air that PCA unit 12 outputs is affected by the temperature of the air it is receiving to heat or cool. For example, the output temperature of a PCA unit 12 in cooling mode when cooling one hundred ten degree outside air is different than when cooling seventy-five degree outside air. In general, a PCA unit 12 should be able to change the air temperature a given amount, often referred to as a "ΔT" (Δ meaning difference, and T meaning temperature), the difference in output air temperature verses input air temperature.

To that end PCA monitor 210 comprises an ambient air sensor 58 located away from any influences such as sunlight or thermal exhausts. It may be put directly in an entrance 60 to the PCA unit 12, although it is not shown that way in this illustration. If a bridge way 14 has a return duct 62 to the PCA unit 12, it may have a return temperature sensor 64. The PCA monitor 210 has a main box 211 that includes processing circuitry 54 to determine a value indicative of delta T, and the memory device 48 similarly contains acceptable limits for delta T.

Although the main box 211 is illustrated as different from the main box 11, it is contemplated that a single main box 211 may be manufactured, and the features either not used or fully used, depending upon the actual installation.

Figure 5:
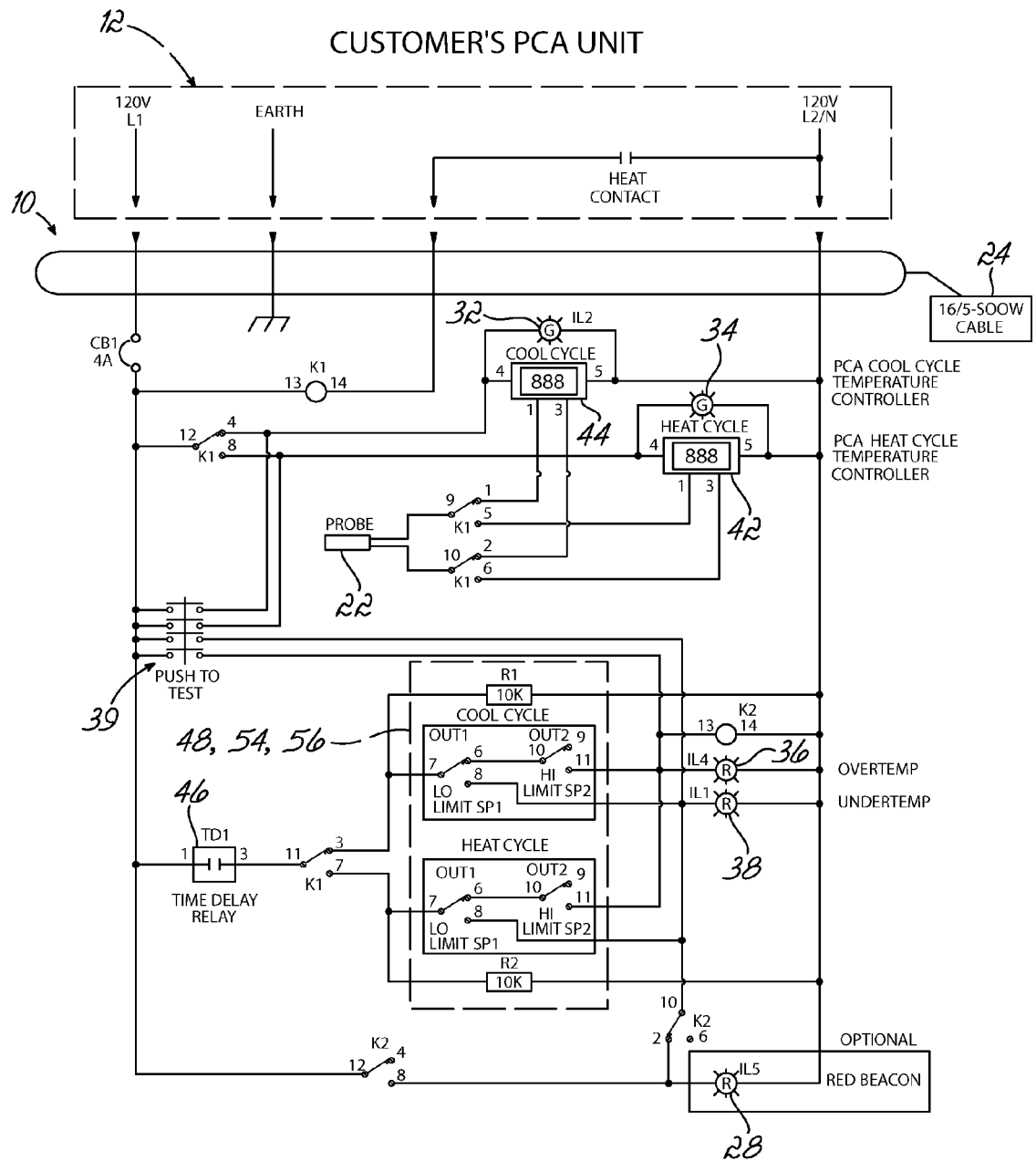
FIG. 5 is a partial electrical schematic of the embodiment of FIG. 1.

FIG. 5 is an electrical schematic of the embodiment 10, with numerals corresponding to those described with reference to previous figures.

The invention has been described herein with reference to specific embodiments, and those embodiments have been explained in substantial detail. However, the principles of the present invention are not limited to such details which have been provided for exemplary purposes. Further, the monitoring system although specifically described in terms relevant to a PCA unit 12 at an airport, may apply to other devices heating and cooling air or another gas or liquid.

What is claimed is:

1. An apparatus for communicating performance of a preconditioned air unit associated with an airport gate comprising:
   a temperature sensor in a stream of output air leaving the preconditioned air unit producing a signal indicative of the temperature of the output air;
   circuitry to compare the signal to an acceptable range of values; and
   an output device to convey to a human operator a result of a comparison of the signal to the acceptable range of values when the preconditioned air unit is running and stabilized.

2. An apparatus for communicating performance of a preconditioned air unit associated with an airport gate comprising:
   a first temperature sensor in a stream of output air leaving the preconditioned air unit producing a signal indicative of the temperature of the output air;
   a second temperature sensor producing a signal indicative of the temperature of input air entering the preconditioned air unit;
   circuitry to determine a value indicative of a difference in temperature between the output air and the input air and compare the difference to at least one acceptable value; and
   an output device to convey to a human operator a result of a comparison of the signal to the acceptable range of values when the preconditioned air unit is running and stabilized.

3. A method of identifying a malfunctioning preconditioned air unit comprising:
   measuring temperature of air at a location downstream of the preconditioned air unit, the location being positioned in a pathway of air discharged to a volume that the preconditioned air unit is serving;
   sending a signal indicative of the measured temperature to a comparison circuit;
   comparing the temperature measured to a desired temperature; and
   generating an alert signal if the temperature measured does not compare favorably with the desired range.

* * * * *